J. BALL & H. BROOKS,
MARY BROOKS, administratrix of H. BROOKS, dec'd.
SMOKE STACK FOR LOCOMOTIVES.
No. 9,820. Reissued July 26, 1881.
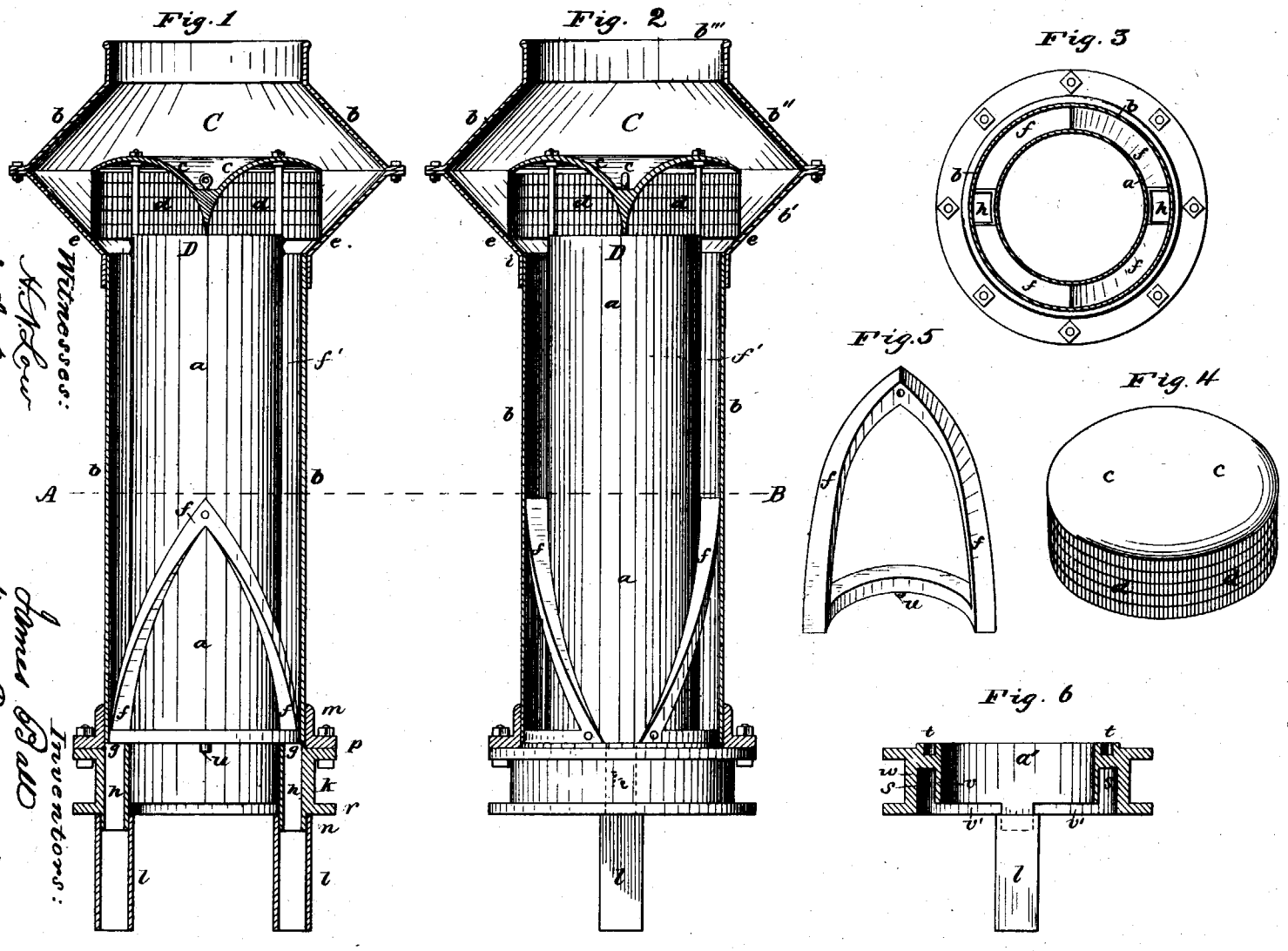
Witnesses:
H. N. Low
J. A. Robinson
Inventors:
James Ball
Mary Brooks, Administratrix of Hugh Brooks, deceased
By John K. Robinson, their attorney
N. PETERS, Photo-Lithographer, Washington, D. C.

UNITED STATES PATENT OFFICE.

JAMES BALL AND MARY BROOKS, OF ZANESVILLE, OHIO; SAID MARY BROOKS ADMINISTRATRIX OF HUGH BROOKS, DECEASED.

SMOKE-STACK FOR LOCOMOTIVES.

SPECIFICATION forming part of Reissued Letters Patent No. 9,820, dated July 26, 1881.

Original No. 59,175, dated October 30, 1866. Application for reissue filed May 2, 1881.

*To all whom it may concern:*

Be it known that we, JAMES BALL and MARY BROOKS, citizens of the United States, residing at Zanesville, in the county of Muskingum and State of Ohio, (the said MARY BROOKS being the administratrix of Hugh Brooks, deceased, late of said city, county, and State,) have invented certain new and useful Improvements in Smoke-Stacks for Locomotives; and we do hereby declare that the following is a full, clear, and exact description of the invention, which will enable others skilled in the art to which it appertains to make and use the same.

Our improvement relates to, and is applicable particularly to, that class of locomotives and other steam-boilers which have a forced blast created by the exhaust-steam from the engine, and discharged in or projected up the chimney in the direction of or corresponding with the natural line of the draft, and is provided with mechanism and means for arresting sparks, cinders, or combustible products in the chimney or stack and transferring them therefrom into and down an annular chamber to pipes or flues located in the smoke-box, from which they may be conveyed to any desired receptacle arranged to receive them.

Our invention consists, first, in a novel combination, with a cylindrical outer case and internal cylindrical smoke-tube having a deflecting-plate located thereon and arranged coincident with the exit-aperture of the smoke-tube to arrest and deflect the sparks and products of combustion and turn them downward, the said outer case and inner smoke-tube forming an annular spark-return chamber in which are located suitable curvated pyramidal-shaped spark deflectors or guides, the obtuse angles or edges of which converge downward and are arranged between the internal surface of the outer case and external surface of the internal smoke-tube, and also communicating and terminating at suitable openings in and leading from the base of the stack-seat or smoke-arch to pipes located in the smoke-box, for the purpose of conducting the sparks and products of combustion down the return-spark chamber to and through the said pipes in the smoke-box, whereby, in conjunction with the force of the exhaust-steam projected up the internal smoke-tube, the sparks and products of combustion are arrested, concentrated, and controlled by being made to pass into a suitable receptacle arranged to receive them within or without the smoke-box, and the gaseous elements in the blast are free to escape by lateral expansion into and out of the upper portion of the hood or bonnet of the stack; second, in the arrangement and novel combination, with an outer case and inner smoke-tube arranged as an annular spark-return chamber, of a metallic stack-base, provided with a central opening for the insertion of a central smoke-tube, and with lateral axial openings located in a suitable position to connect with curvated pyramidal-shaped spark deflectors or guides, which rest upon a portion of the upper annular surface at the stack-base, the said lateral openings being provided with tubular projections on the under and outer surface of the stack-base, for the more convenient attachment to pipes in the smoke-box, the said stack-base being also provided with hollow chambers located between its inner and outer shell, the object being to form heating-chambers in the base to heat the products of combustion passing through the openings or educts located on either side of the hollow chambers on their way to the pipes in the smoke-box, for the purpose of preventing the cooling or chilling of the sparks when mixed with moisture or condensation of the exhaust-steam, thereby preventing corrosion or oxidation of the metal that dampened sparks and dirt would make when allowed to be choked up or remain within the spaces between the inner and outer stack, and is also provided with top and bottom flanges to secure the cast base to a saddle on the smoke-arch and to the smoke-stack by bolts or otherwise.

To enable others skilled in the art to make and use our invention, we will proceed to describe its construction and operation.

Figure 1 is a sectional elevation of chimney or stack, and Fig. 2 is a sectional elevation at right angles with Fig. 1. Fig. 3 is a horizontal section of the chimney or stack on the lines A B of Figs. 1 and 2. Fig. 4 is a perspective view of the barrel-netting. Fig. 5 is a perspective view of the curvated pyramidal-shaped spark-deflectors. Fig. 6 is a vertical section of the stack-base.

Like letters of reference in the drawings denote like parts.

The outer case, *b*, is a metallic cylinder, and is connected at the bottom by the flanged casting *n*, which is bolted to the flange *p* of the base *k*, which has an under surface which may be attached to a saddle on the smoke-arch by bolts or otherwise. The base is provided with a central axial perforation, *a'*, several inches less in its internal diameter than that of the outer case, and for the purpose of inserting the internal smoke-tube, *a*, the lower end of which should be flush with the lower edge of the inner shell of the air-chambers *s s*. The outer case, *b*, and internal smoke-tube, *a*, having been placed in their relative positions on the stack-base *k*, one encircling the other, an annular space of several inches therefore exists between them, thereby forming the annular spark-return chamber *f'*.

Suitable lateral axial openings or spark-educts, *h h*, which are also the points of concentration for the sparks passing down the spark-return chamber over curvated pyramidal-shaped spark deflectors or guides *f f*, within the body of the stack-base, are provided, and have under tubular projections, *n n*, cast thereon in such a manner that pipes *l l* may be attached to them within the smoke-box for the purpose of passing the sparks and products of combustion to and within said pipes, from which they may be carried to any suitable receptacle prepared to receive them within or without the smoke-box.

Hollow hot-air chambers *s s* are cored out between the inner and outer shells of the stack-base or casting *k*, their circumferential continuity being broken by the axial partitions of the openings or educts *h h*. The upper portion of the said stack-base being solid, except at the lateral axial openings *h h*, the hot-air chambers *s s* have no direct connection with the spark-return chamber *f'*, but form a seat for the bottom of the curvated pyramidal-shaped spark deflectors or guides *f f* to rest upon, and are provided with perforations *t t*, to secure and insert the studs or bosses *u u*, fixed on the bottom of the curvated pyramidal-shaped spark deflectors or guides *f f*, to keep them in their proper places, and to prevent them from moving over or closing up the openings or educts *h h*.

The inner lower edge of the shell *v*, Fig. 6, is cut off in a manner whereby openings or spaces *v' v'* are provided leading to the hot-air chambers *s s*, into which heat and hot-blast may enter while being projected up the internal smoke-tube *a* for the purpose of heating the unconsumed products passing through the educts or openings *h h*. The lower portion of the outer shell, *w*, of the chambers *s s* are made tight by being attached to the upper surface of the saddle of the smoke-arch by screw-bolts or otherwise.

The upper end of the outer case, *b*, is surmounted with a metallic hood, C, having the form of two hollow conic frustums, *b'* and *b''*, of like size and united at their bases by bolts or otherwise, thereby forming a concavo-concavous-shaped hood interiorly, and having an exit-opening, *b'''*, in the upper part equal to the internal diameter of the outer case, *b*.

The internal smoke-tube, *a*, consists of a metallic cylinder several inches less in diameter than the outer case, *b*, and of an internal area proportionate to the internal smoke tubes or flues located within the boiler. The lower part of the internal smoke-tube, *a*, is fastened to the internal surface of the central axial perforations in the metallic stack-base *k*. The upper end or exit-aperture, D, projects several inches above the junction *i* of the lower portion of the hood C and upper end of the outer case, *b*, whereby the said internal smoke-tube, *a*, is elevated in reference to the internal upward-flaring surface of the lower conic frustum, *b'*, of the hood C, to insure the exit of the sparks and products of combustion from the exit-aperture of the internal smoke-tube at an elevation sufficient to discharge most of the sparks upon the inner surface of the said lower conic frustum, for the purpose of retarding or breaking the force of the sparks and extinguishing the same on their course to the spark-return chamber, thereby preventing them from packing or blocking up the openings in the stack-base or pipes leading therefrom.

Projecting from and attached upright to the upper end of the internal smoke-tube, *a*, are three or more standards or rods of iron which support a deflecting-plate, *c*, the diameter of which is several inches larger than the internal diameter of the cylindrical outer case, *b*. The said deflecting-plate *c* is arranged and located above, adjacent to, coincident with, and about ten inches from the exit-aperture of the internal smoke-tube, *a*, for the purpose of arresting the sparks and products of combustion and deflecting the same in a downward direction.

On the outer circumference and upper edge of the deflecting-plate *c* a suitable cylinder of wire-cloth or barrel-netting, *d*, may be attached by bolts or otherwise, the lower edge projecting below the exit-aperture of the internal smoke-tube, and also arranged to come in contact with and rest upon the upward-flaring inner surface of the lower conic frustum, *b'*, as at *e*, of the hood C, for the purpose of allowing the gaseous elements in the blast to have a free expansion and easy escape outwardly, and to preclude the unconsumed products from escaping directly into the open air.

One or more curvated pyramidal-shaped spark-deflectors or metal guides, *f f*, as shown in Fig. 5, are placed between and fitted closely to the curvatures of the inner smoke-tube, *a*, and outer case, *b*, and are provided with under projections or bosses, *u u*, which fit into the perforations *t t*, Fig. 6, made in the upper annular surface of the stack-base *k*, upon which the curvated pyramidal-shaped deflectors are seated in such a manner whereby the inclined lower obtuse edges or angles. *g*, Fig. 1, of the deflectors are held in their relative positions to the openings or educts *h h* in the stack-base *k*, the purpose and use of the said curvated pyramidal-shaped deflectors or guides being to conduct or lead the sparks and products of combustion downward and over the said inclined obtuse edges of the spark deflectors or guides through the spark-return chamber *f'* to the openings or educts located in the stack-base, thus concentrating them in the said openings and pipes in the smoke-box.

While describing the preferred form of our improvement we reserve the right to vary the details of construction—as, for example, the barrel-netting may be dispensed with and the usual top netting may be placed above the deflecting-plate. The inclined spark deflectors or guides may be made of sheet-metal plates fastened or riveted around the inside of the outer case or outside of the inner tube in any suitable manner, so the edges come in close contact with both tubes, to prevent the passage of sparks and dust between them.

The operation of a smoke-stack involving our invention and constructed as arranged and shown, would be as follows: When the engine is not in motion the smoke and gases would pass through and out of the stack in the usual manner. As soon as the engine is started the exhaust-steam is discharged therefrom and is projected up the smoke-tube, and carries with it the products of combustion, (gas, smoke, sparks, and cinders,) which will, on reaching the exit-aperture D of the smoke-tube *a*, expand, and, being further impelled by a continuous discharge of the exhaust-steam, strike with force against the deflecting-plate *c*, which will arrest their upward course and deflect them downward. The smoke, waste steam, and gases will escape outwardly, but the sparks and ashes will descend and fall on the retarding-surface of the bell-mouth *b'* of the annular spark-return chamber *f'*, from whence they will pass into the annular space of the spark-return chamber between the smoke-tube *a* and the outer case, *b*, and in their descent will slide down the curvated pyramidal-shaped spark deflectors or guides *f f* to the axial openings or educts *h h* in the stack-base *k*, thus concentrating said sparks and products of combustion in this instance at points within the stack, from where they pass directly to the pipes *l l*, located in the smoke-box, and from whence they may be carried to any suitable receptacle prepared to receive them, either within or without the smoke-box directly to the ground. If any fine particles of sparks, cinders, or ashes should escape outward they will first strike against the inside walls of the hood, which, from the peculiar shape of its construction, will prevent them from at once escaping out of the opening at the top of the hood, and will fall back and roll down the inclined lower surface of the hood to the spark-return chamber.

It will be observed in the practical operation of the device that the sparks and products of combustion are by the action of the exhaust-steam forced with a high velocity against the deflecting-plate, and with a corresponding force upon the bell-mouth surface in the lower part of the hood, which breaks the force of those falling thereon, thus retarding them, thereby giving time for those falling directly into the spark-return chamber to first pass over the curvated pyramidal-shaped spark-reflectors and directly through the openings or educts at the points of concentration in the base of the stack, thus precluding the possibility of clogging or blocking up the same without reference to the speed the engine may be running, and forcing the sparks upward in the smoke-tube.

We are aware that numerous complicated and expensive mechanical contrivances have been heretofore designed and constructed to arrest and conduct in a downward or reverse direction to that of the blast discharged upward through the smoke-tube of a locomotive smoke-stack such sparks and products of combustion that may be carried in an upward direction to the upper part of the stack, either to be utilized as fuel by returning them to the furnace, or by passing them into or through the smoke-box, or by retaining them within the chamber of the stack to be removed through doors or slides arranged on the outside lower part of the same. Annular spark receivers or chambers have been arranged and formed by the combination of inside and outside tubes, and with conical deflecting-plates located inside of the stack on the upper ends of the smoke-tube, and the chamber or receiver made sufficiently tight to retain water between the lower portion of the partitions or tubes forming said chambers or receivers to extinguish the sparks forced downward and deposited therein. Other stacks have been provided with pipes connecting with annular chambers and the upper part of the stack, and open through to the smoke-box; and in others pipes have been continued down to the lower portion of the smoke-box and arranged to deliver the sparks to the lower tubes in the boiler to be transferred through them to the fire-box or furnace. Net-work of wire-cloth and perforated frames of various forms and sizes have been located and arranged within the upper part of stacks and in the smoke-box to preclude the escape of the sparks into the open air. Saddles or seats of cast-iron with central and lateral openings or educts cast in them and contrivances arranged for direct and indirect attachment to the smoke-arch have been known and used before; but in all such instances said devices have failed to perform in a satisfactory manner the object sought to be accomplished, and have been attended with greater objections than those which their application was intended to improve, being complex, unwieldy, and expensive. To any and all such individual devices we make no claim; but we are not aware, however, that before our invention sparks or other solid unconsumed products of combustion have ever been satisfactorily controlled by first directing them against a deflecting-plate for arresting their progress upward in such a manner that when thus arrested they could be driven by the force of the succeeding intermittent action of the exhaust-steam into and down an annular spark-return chamber and over pyramidal-shaped deflectors, which would insure a concentration of all of the said unconsumed products at one or more points of egress within the lower part of the stack or base for delivery or control of all to suitable desired receptacles within or without the smoke-box, or upon the ground, as may be desired.

We therefore claim as new and desire to secure by Letters Patent—

1. In a locomotive smoke-stack, the curvated pyramidal-shaped deflectors *f f*, substantially as described, and for the purpose set forth.

2. The combination, within a smoke-stack, of the smoke-tube *a*, deflecting-plate *c*, and spark-return chamber *f'*, provided with the curvated pyramidal-shaped deflectors *f f*, substantially as described, and for the purpose set forth.

3. The combination, within a smoke-stack, of the smoke-tube *a*, deflecting-plate *c*, barrel-netting *d*, and spark-return chamber *f'*, provided with the curvated pyramidal-shaped deflectors *f f*, substantially as described, and for the purpose set forth.

4. The combination of the smoke-tube *a*, deflecting-plate *c*, and spark-return chamber *f'*, with the curvated pyramidal-shaped deflectors *f f*, and the cast stack-base *k*, provided with lateral axial openings or educts *h h*, substantially as described, and for the purpose set forth.

5. The combination of the smoke-tube *a*, deflecting-plate *c*, and spark-return chamber *f'*, with the cast stack-base *k*, provided with lateral axial openings or educts *h h*, and hollow hot-air chamber *s s*, arranged with openings *v' v'*, communicating with the interior of the internal smoke-tube, *a*, substantially as described, and for the purpose set forth.

6. The combination of the cylindrical outer case, *b*, provided with the concavo-concavous-shaped hood C, cast stack-base *k*, having the openings or educts *h h*, internal smoke-tube, *a*, deflecting-plate *c*, and spark-return chamber *f'*, arranged with the spark-deflectors *f f*, having obtuse edges, the lower ends of which communicate directly with the openings or educts *h h*, leading to pipes *l l* located in the smoke-box, substantially as described, and for the purpose set forth.

JAMES BALL.
MARY BROOKS,
*Administratrix of Hugh Brooks, deceased.*

Witnesses:
CHAS. A. BEARD,
J. W. MARTIN.